United States Patent [19]

Ferrell

[11] 4,418,542
[45] Dec. 6, 1983

[54] VEHICULAR THOROUGHFARES FOR POWER GENERATION

[76] Inventor: Robert D. Ferrell, 26 Jaeger Dr., Old Brookville, N.Y.

[21] Appl. No.: 231,537

[22] Filed: Feb. 4, 1981

[51] Int. Cl.³ .................. F04B 9/10; F04B 35/02; F03G 5/00
[52] U.S. Cl. .................................. 60/668; 417/229
[58] Field of Search .............. 417/229, 231, 233; 60/668, 370

[56] References Cited

U.S. PATENT DOCUMENTS

| | | | |
|---|---|---|---|
| 2,060,890 | 11/1936 | Olafson | 417/229 X |
| 4,212,598 | 7/1980 | Roche et al. | 417/229 |
| 4,309,150 | 1/1982 | Payne | 417/229 |

*Primary Examiner*—Richard E. Gluck
*Assistant Examiner*—Peter M. Cuomo
*Attorney, Agent, or Firm*—Sprung, Horn, Kramer & Woods

[57] ABSTRACT

A roadway of the type over which motor vehicles pass, e.g. automobiles, trains, trolleys, etc., is disclosed where the roadway is one positioned in the path of movement of such vehicles and is provided with a power generating means for generating power in response to the movement of such vehicles over the roadway. The power generating means is responsive to and actuated by the weight of the vehicles as the vehicles pass thereover. The power generating means comprises a vertically displaceable generally planar member which is generally co-planar with the roadway. The power generating means comprises a fluid housed in a fluid housing which is in fluid communication with a generator via a transmission means. The fluid, while in the housing, is in contact with a displaceable bearing surface which when displaced acts upon the fluid, the displaceable bearing surface in turn being connected to the generally planar member. When a motor vehicle passes over the generally planar surface, the same is vertically displaced whereby to displace the bearing surface against the fluid. The fluid in turn acts through the transmission means to effect generation of energy.

10 Claims, 10 Drawing Figures

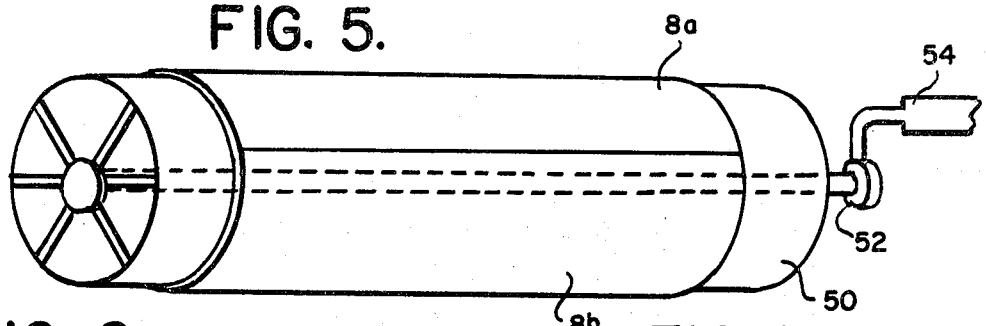
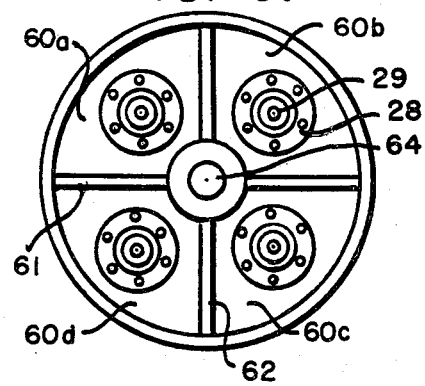
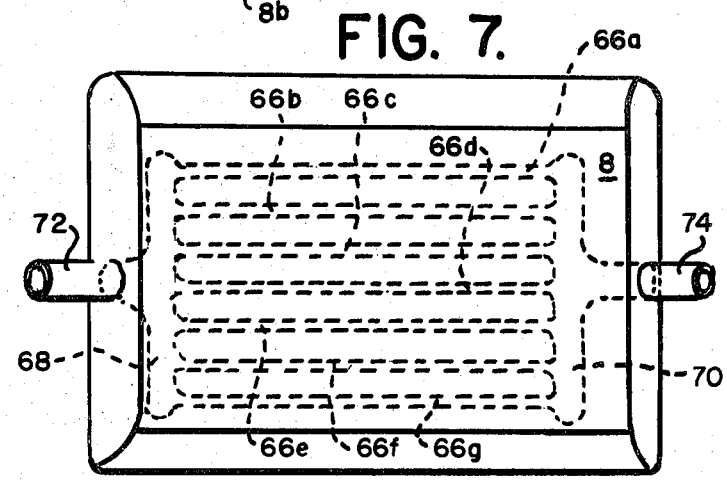
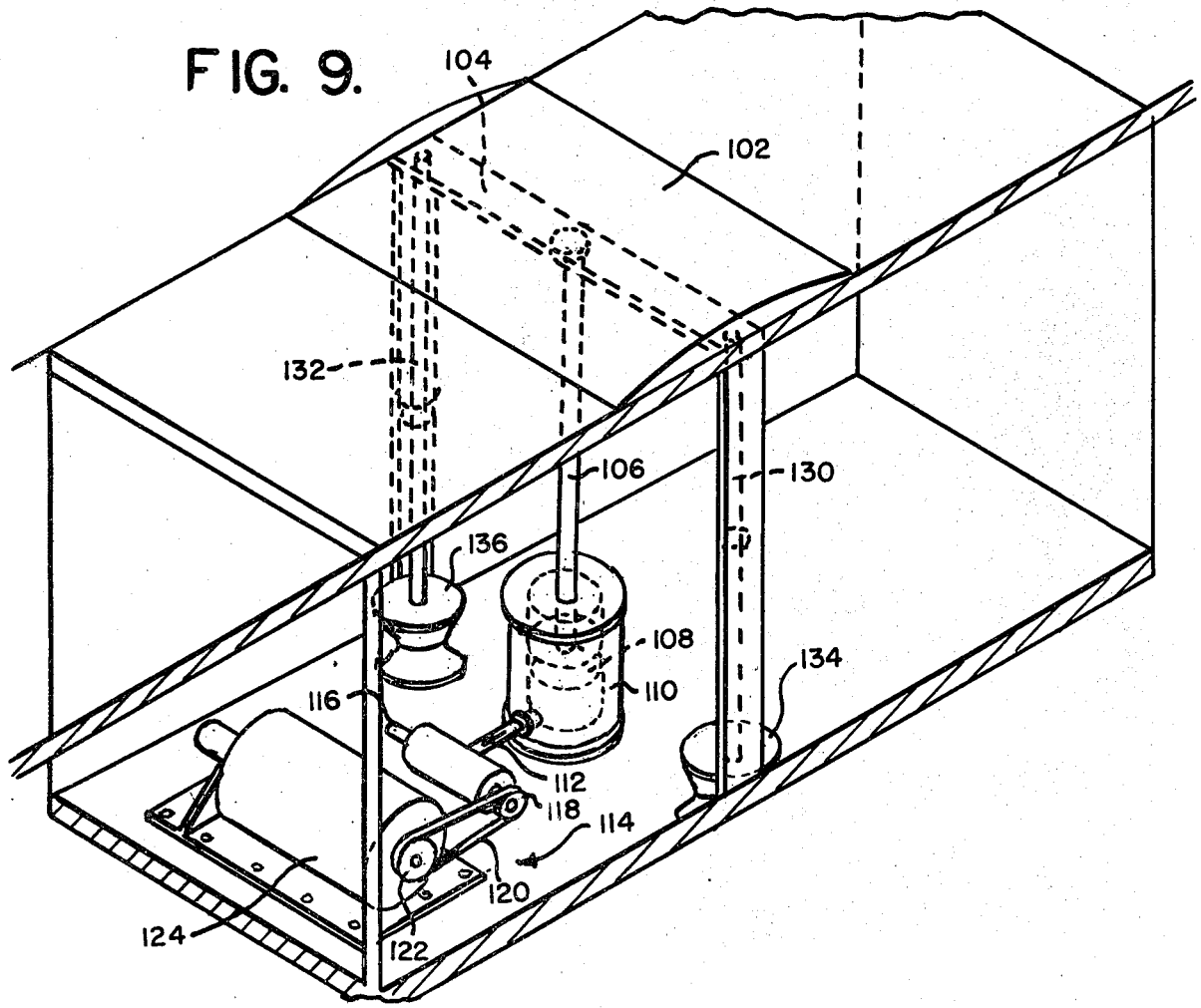

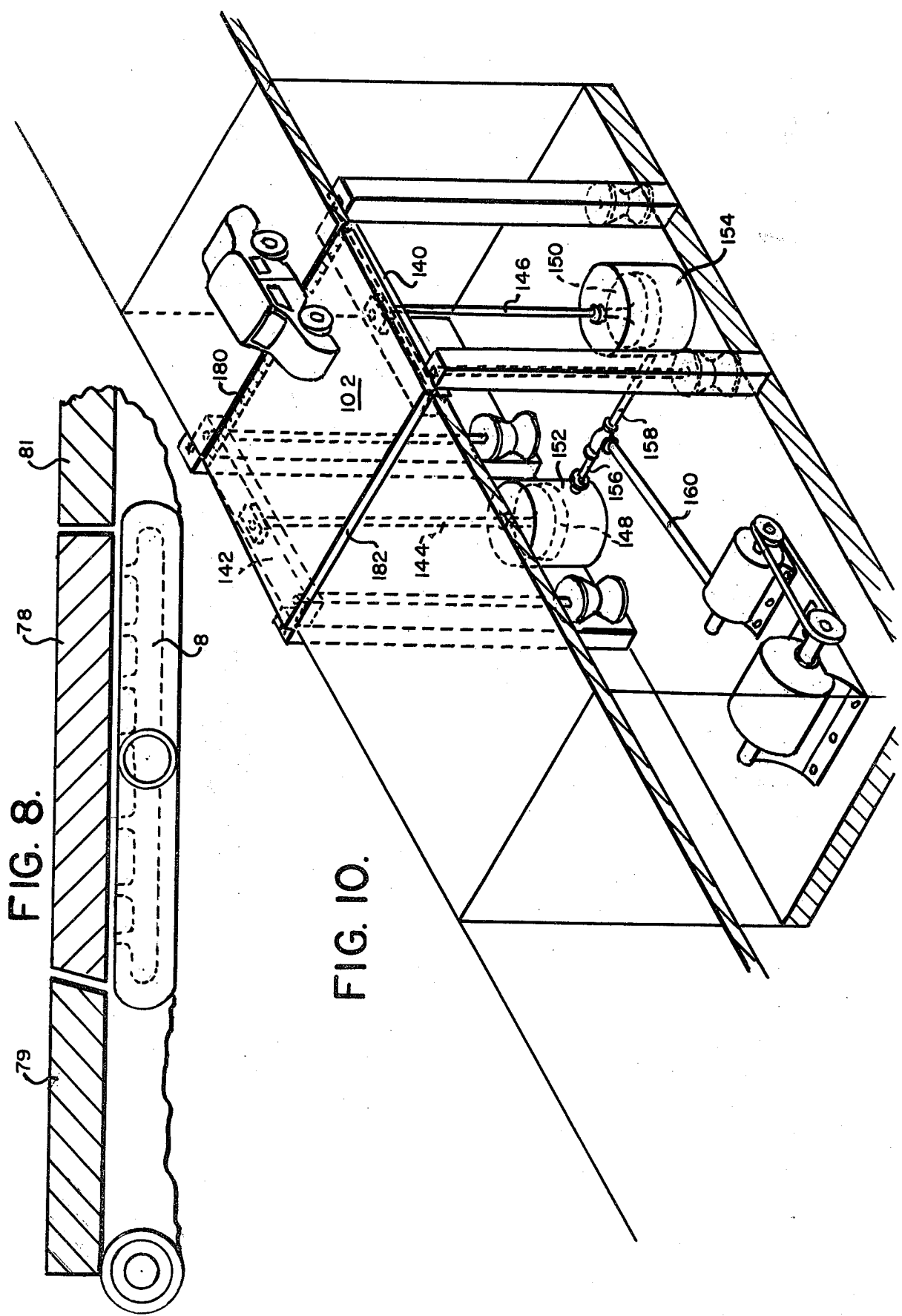

VEHICULAR THOROUGHFARES FOR POWER GENERATION

BACKGROUND OF THE INVENTION

1. Field of the Invention

This invention relates to a roadway equipped with a power-generating means to generate power by virtue of the movement of a motor vehicle over the roadway. More particularly, this invention relates to a roadway equipped with such a power-generating means which is responsive to and actuated by the weight of a motor vehicle as it passes over such roadway. More especially, this invention relates to the generation of power by virtue of the weight of a motor vehicle passing over a roadway whereby fluid housed in a fluid housing is caused to move and to effect generation of energy via a transmission mechanism.

2. Discussion of the Prior Art

Volumes could be written about the heavy emphasis on energy consumption and energy generation. In these days with the dramatic rise in the cost of oil, which so adversely effects the cost of generating electricity, alternate sources are being considered for the generation of energy. For instance, it is becoming increasingly popular to decrease energy consumption in the home by the use of solar panels disposed on or near the same, whereby to extract heat from the sun and by heat exchange to heat the hot water within the building. Other means involving heat pumps and the like have been developed as a savings towards fuel oil consumption.

Electrical utilities are considering non-petrolium sources of power for the generation of electricity. Thus, many utilities have reconverted their facilities so that the electricity can be generated by steam heated by the use of coal or by means of a nuclear reaction.

There has been an increasing emphasis upon extracting energy from various sources. It is known to utilize the power from an automobile or other moving vehicle to generate power, especially electricity. Thus, for instance, it is known to use the movement of a locomotive or the revolution of the axial of a train to generate electricity for internal use within the train. Similarly it is known to use the revolutions of a bicycle tire to generate electricity for a portable lamp attached to the bicycle. It is also known from U.S. Pat. No. 3,859,589, to generate electricity for houses and the like by disposing an automobile's driven wheel over a pair of fluted rollers adapted to receive the same. The rollers in turn are rotated in response to the rotation of the automobile's drive wheel which automobile is disposed in stationary position whereby alternating current or direct current is generated. A device of that type is also disclosed in U.S. Pat. No. 3,943,370, where means are provided to jack the vehicle up and to utilize the revolutions of the vehicle to engage a means in turn connected to a generator. See also U.S. Pat. No. 2,712,109.

It has also been proposed to generate electricity by the use of vehicles passing along a roadway, such being disclosed in British Pat. No. 1,332,202 and U.S. Pat. No. 1,916,873.

Heretofore, the extraction of energy from a moving vehicle along a roadway has generally been either to effect rotation of a rotatable member disposed in said roadway (U.S. Pat. No. 3,885,163), or to utilize the weight of such vehicle to displace a lever arm or the like, which in turn effects revolution of a rotatable member by engagement of ratchets mounted on the lever arm with correspondingly shaped receiving teeth on the rotatable member. (U.S. Pat. No. 1,916,873). Alternatively, means have been provided in the path of the moving vehicle which restrains forward movement of the vehicle, these means being disposed significantly above the roadway and being connected to remotely positioned transmissions means. This is not only unsightly, but dangerous and such means are readily damaged by the movement of vehicles at high speeds or in turn damage the vehicles. Such a means for power generation by the use of the rotation of a motor vehicle over such obstructing means is impractical and undesirable. Not only does it present a dangerous obstacle in the path of the moving vehicle, but when it is struck by the moving vehicle, the force transmitted through the moving vehicle is of such magnitude as to toss the occupants of the vehicle about and endanger their physical well-being.

The use of ratchets mounted on a shaft responsive to means generally co-planar with the roadway, is far superior to the disposition of an obstacle in the path of the vehicle, but such conversion of the weight of the moving vehicle to energy is inefficient and subject to ready breakdowns. Moreover, such installations requires many complicated and relatively undependable mechanical parts. Means must be provided to redispose the shaft to its initial position, all of which involves valuable time loss and inefficiency in the conversion of weight from the moving vehicle to energy.

For instance, in U.S. Pat. No. 3,916,873, such a mechanism is disclosed which requires three separate plate members in the roadway for engagement with a single tire of the automobile and up to five of such plates (FIG. 4). These plates must be returned to their original position by the use of springs. While such a mechanism might have been useful in connection with the light-weight vehicles of the early 1930s, such a mechanism is impractical considering the heavy vehicles on modern roadways.

It became further desirable to provide such a power-extracting means which did not depend upon revolution of rollers disposed on the roadway and which generated the power without the use of undependable mechanical linkages, springs and the like to reset the mechanism. It became further desirable to provide the roadway equipped with such a power-generating means where the power was generated in response to the weight of a moving vehicle over a generally planar member disposed co-planar with the roadway.

It became still further desirable to provide such a weight responsive power-generating means in the roadway which did not require for its power generation, the movement of ratcheted shafts disposed beneath the roadway.

SUMMARY OF THE INVENTION

These and other objects are provided, in accordance with this invention, by a roadway of the type over which a moving vehicle passes, said roadway having positioned in the path of the movement of such vehicle, power-generating means for generating power in response to movement of said vehicles over said roadway, said power generating means being responsive to and actuated by the weight of said vehicle as it passes thereover, said power-generating means comprising a vertically displaceable, generally planar member, generally co-planar with the roadway, said power-generating means comprising a fluid housed in a fluid housing, said fluid being in fluid communication with a generator via a transmission means, said fluid while in said housing being in contact with a displaceable bearing surface which when displaced acts upon said fluid, said displaceable bearing surface in turn connected to said generally planar member whereby when a motor vehicle passes over said generally planar surface, the same is vertically displaced, whereby to displace said bearing surface against the fluid.

The present invention has several important and distinct embodiments. In one embodiment, the power-generating means is in the form of an elastic compressible and deformable container which contains said fluid and is reresponsive to the weight of the moving vehicle. In such form, when the vehicle passes over this new roadway thoroughfare and is in contact with the generally planar member, the container is deformed and the fluid therein is displaced to engage the transmission means.

Preferably, in such form the compressible elastic and deformable container comprises a body portion disposed vertically beneath the generally planar member, the body portion in turn being connected to a neck member which is in fluid communication with the fluid in the container. The neck member itself houses the fluid and protrudes from the body portion and is in engagement with the transmission means.

Another embodiment of the invention is one in which the generally planar member is connected to a piston rod disposed in a cylinder which contains a transmission fluid between the piston head and the base of the cylinder. The cylinder has fluid outlet and fluid inlet and the fluid outlet is in fluid communication with the transmission means. In this embodiment it is preferred that the generally planar member be connected to the piston via a transverse beam connected to the generally planar member and running transversly across such member i.e., transverse to the flow of traffic over the generally planar member. Such transverse member is in the form of a beam and also is co-planar with the roadway. In such form it does not represent an obstruction to the flow of traffic and in such form does not impede a vehicles flow nor endanger the vehicle or its occupants. In such embodiment the transverse beam is preferably attached to at least one vertically disposed guide which depends vertically from the transverse beam, the lower end of which guide is connected to a bellows element. The guide beams serve to re-dispose the transverse beam upwardly so as to reposition them for depression by the weight of a moving vehicle. Preferably, a pair of such vertically disposed guides are disposed, each of which is connected at its terminal end to a bellows element.

Referring to the first-discussed embodiment above, i.e., that wherein an elastic compressable and deformable container which contains a fluid is employed, the same can be disposed so that its upper surface itself is the generally planar member. Alternatively, the deformable container can be disposed below a separate generally planar member which itself is vertically moveable in response to the weight of a vehicle thereover. In either case, when the vehicle moves over the point of the roadway where the mechanism constituting the roadway is disposed, the weight of the vehicle causes the container to be compressed and a bulge to form. The formation of this bulge is in turn used to create energy by transmitting this created movement to an energy creating means such as an electrical generator, via a transmission mechanism. To maximize the bulge and to insure that as much energy is transmitted to the generator as possible, the container is equipped with a rigid retaining means about a major portion of the container except in the area of the bulge, so that all of the fluid which is compressed by virtue of compression of the container, is directed to the point of the bulge and a dramatic and rapid pulse occurs at the bulge whereby the dramatic surge in movement effect energy generation.

Energy generation by the use of such a deformable container is effected by the employment of a transmission means between the container and the generator. The piston disposed in a cylinder whereby mechanical, electrical or thermal energy are provided. Alternatively, the deformable container can be attached to a toggle, an eccentric on a wheel, a leaver, a crank or a pully, to produce some type of useful work.

The deformable container can have any shape. It can be cylindrical or rectangular like a mattress. It may be solid, empty, honey-combed with air pockets and can be reinforced with various flexible or inflexible materials at suitable places. Preferably, it is made of a strong, deformable thermoplastic thermosetting material or a rubbery type material. At various places such as at its ends, top and bottom, the device can be reinforced with a solid element such as a rod, lever, toggle, plate gear, fluid magnetic device or the like so that when the device expands or contracts under positive or negative pressure, the mechanical device so attached moves any one of a piston, bellows, diaphragm, drum, magnet, electrical device, wheel or the like, whereby mechanical work is performed. This mechanical work in turn, can be converted to electrical or thermal energy. The specific means by which the movement effected in the deformable contained is transmitted into energy is of secondary importance.

Deformation of the deformable container can be effected by the use of an automobile, truck or the like passing thereover or, in accordance with one embodiment of the invention, by the use of a train pressing down upon rails or ties disposed thereover. A loss of volume at the point of depression is in turn coupled with a rise of volume of the fluid at another point within the container which rise in volume occurs at a pre-selected point or points. This causes a controlled pulse which in turn is transmitted to the transmission mechanism. A pulse is provided by virtue of the repeated depression of the deformable mechanism, this pulse being responsive to the weight of and the frequency of motor vehicles passing thereover. The weight of the vehicle initially effects a fluid movement which in turn effects some type of mechanical movement or the like ultimately, preferably, to form electrical pulses. The electricity so generated can be stored in a storage battery.

As stated above, the deformable container is preferably provided with a rigid device for confining the bulge or the point of fluid expansion so that it occurs at a point approximate to or in engagement with the transmission mechanism. This rigid device can be in the form of a cylinder, box-cage or the like. It is provided with openings available for the impact and subsequent deformation. In other instances certain portions of this large "squeeze bottle" can be modified to receive increased loads by making it thicker, by the use of internal bracing or by the use of less flexible material at areas of impact.

The container itself can have any source. It can resemble a bottle, bag, tank, mattress or pallet. In one form it possess a more or less arcuate shape and is disposed on a revolvable drum which in turn is disposed in a pit beneath the roadway. The revolvable drum in turn is provided with a rotating means to facilitate rotation of the rotatable drum. In this embodiment there are a plurality of such deformable containers, each of which is disposed about and connected to the revolvable drum. Rotation of the revolvable drum by the rotating means disposes different deformable containers in engageable position with respect to the motor vehicles passing thereover. When the respective containers are disposed in such engagement position, they are in turn connected to or responsive to the transmission means. By the use of such a mechanism, the respective deformable containers can be rotated out of surface when repair thereon is required. In other words, the entire device need not be taken out of service. It is simply rotated to provide a new engageable, and deformable surface so that a container disposed on the rotatable drum which is out of service can be repaired.

The container can be so constructed with respect to the transmission mechanism, so as to extrude itself through the confining means e.g. rigid frame mentioned above, alternatively the deformable container can be fitted with ports to which mechanisms can be fitted, which mechanisms can in turn provide the motile element to impart movement to a machine whereby to produce work. The elastic and deformable apparatus can be modified throught its length, width and breadth, by varying the design, construction and fabrication. The kind and quality of materials used at various places, and the positioning of the parts with moveable, deformable diaphragms, can be varied in size, place and composition. For example, a port where the diaphragm can be located on the shoulder of the highway and with the passing of each vehicle over the elastic device in the highway, the diaphragm is caused to expand outwardly with the force of a heavy hammer behind it. With the diaphragm attached to the piston rod directly or indirectly, such as via a linkage, the piston is caused to move in the cylinder whereby a reciprocating motion is effected, which in turn is converted to a rotary motion. The rotary motion can be employed to rotate the armature of a generator, whereby to generate electricity.

The container, as an accessory or supplemental element, in turn can be placed upon, across or through the roadbed. It can be directly co-planar with the roadbed or can rise a slight distance above the roadbed. It can have a slight convex shape so as to present a minimum degree of adverse impact on the mechanical portion of the vehicle passing thereover. It can be made of a soft yielding or plastic material whereby when the automobile passes thereover the driver does not lose control of the automobile because the material of the container is an elastic material and thus spreads between the junctures of the normal roadbed and the upper surface of the deformable container. The container can have an upper surface which is corrugated or coated or otherwise made of a non-skid nature. It can have disposed thereon loosely, or rigidly or secured thereto the usual highway material such as concrete or macadam.

The fluid employed in the deformable container can be a gas or a liquid. When it is a gas it is preferably air for obvious economical reasons and when it is a liquid it is preferred that it be an oil such as hydraulic oil. Any other liquid such as water can also be employed.

In one form of the invention wherein a deformable container is employed, the deformable container itself contains as least one compressible elastic and deformable tubular member which in turn contains a fluid e.g., a gas or a liquid. Generally speaking, where such container contains a tubular member, the fluid which is moved to form the energy pulse is contained within the tubular member. Preferably in such an embodiment, a plurality of compressible, elastic and deformable tubes are employed each of which contains the fluid to be displaced. The tubular members can in turn be connected to a common manifold. By such expedient, the fluid is caused to surge from the respective tubes to the manifold which in turns directs the fluid to a particular point where the motion of the fluid is transmitted via a transmission mechanism to a power-generating station.

The invention can also be practiced by the use of piston rods connected to a piston disposed in a cylinder equipped with a fluid inlet and a fluid outlet means, as discussed above.

BRIEF DESCRIPTION OF DRAWINGS

The invention can be more readily understood and appreciated when reference is made to the accompanying drawings in which:

FIG. 5 is a perspective view of an embodiment of the invention wherein the deformable container is disposed on a revolvable drum provided with means to rotate the same. In FIG. 5, the details of the transmission means have been omitted;

FIG. 6 is an end view of a device similar to that shown in FIG. 5 wherein the respective containers disposed about the drum are equipped with ports and diaphragms;

FIG. 7 is a detailed view of a deformable container in accordance with the invention provided with the plurality of deformable tubes connected to common manifolds. In FIG. 7, the connection of the deformable container to the transmission mechanism is not shown;

FIG. 8 is a side view of the device of FIG. 7 showing the manner in which it is disposed beneath a vertically displaceable generally planar member in the plane of the roadway;

FIG. 9 is a perspective view showing another embodiment of the invention wherein instead of using a deformable container the roadway is in direct contact via a transverse beam with piston rod of a piston-cylinder assembly;

FIG. 10 is a view similar to FIG. 9, showing a preferred embodiment of the device of FIG. 9.

DESCRIPTION OF SPECIFIC EMBODIMENTS

Figure 1:
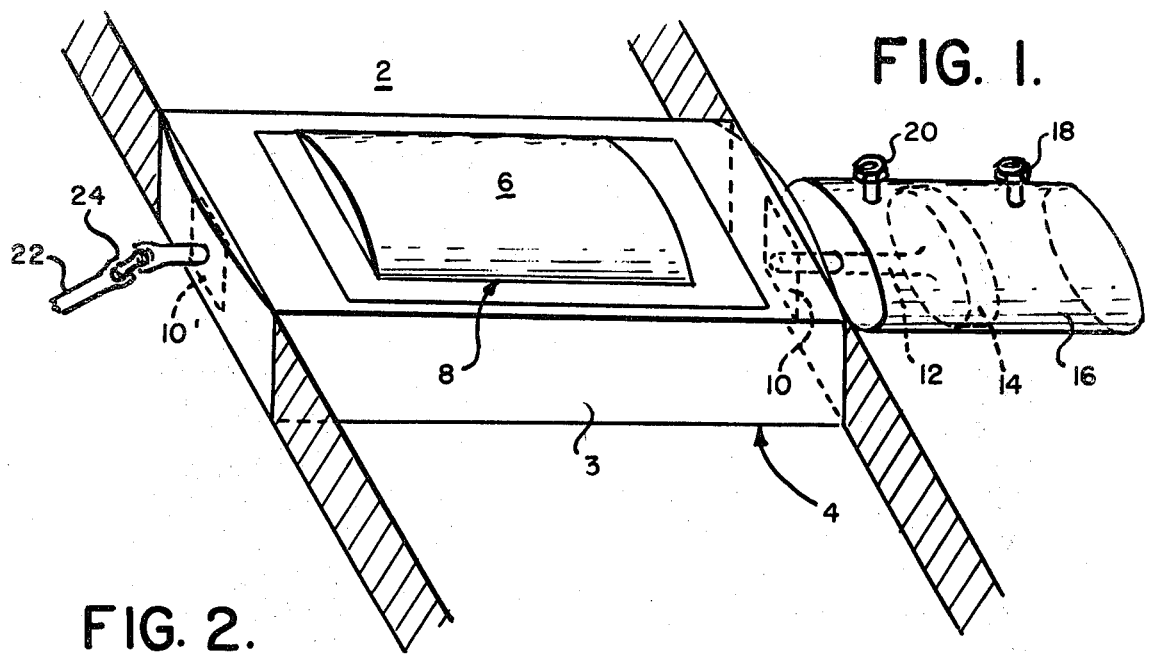
FIG. 1 is a perspective view showing the disposition of a deformable container in a roadway in accordance with one embodiment of the invention.
Figure 2:
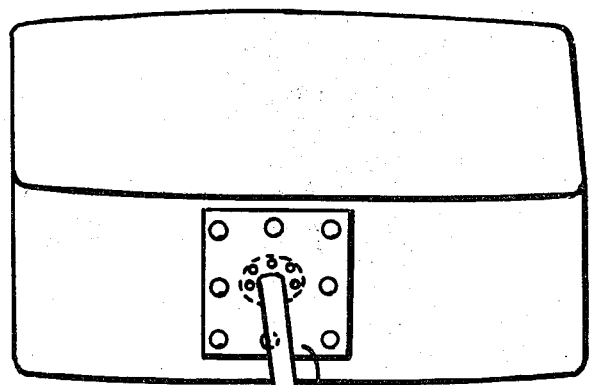
FIG. 2 is a perspective view of a deformable container in accordance with the invention, disposable in a roadway in the manner of the embodiment of FIG. 1, showing the deformable container connected to a piston rod attached to a rigid end plate of the container, which in turn is connected via a coupling to a piston (not shown)

Referring to the drawings herein, in FIG. 1 there is shown a roadway (2) in which there is disposed a power-generating means for comprising an upper surface (4) of upper surface (6), generally co-planar with roadway (2) of a deformable elastic container (8). Upper surface (6) has a slight concave shape. The container (8) is disposed in a generally rigid element (3) which serves to hold the container (8). Container (8) has a rigid plate (10) on a side thereof which is connected to, on the right side as shown in FIG. 1, a piston rod (12) in turn connected to a piston (14) disposed in a cylinder (16). The cylinder (16) is equipped with a hydraulic fluid such as an oil or air and for such purpose has a fluid outlet (18) and fluid inlet (20). Alternatively, as shown on the left side of FIG. 1, and in greater detail in FIG. 2, the rigid plate (10) can be connected to a moveable shaft (22) via a coupling (24) for transmission of energy created by virtue of deformation of the container (8).

In operation, deformation of the container (8) by virtue of the weight of a vehicle passing thereover, causes the rigid plate (10) to bear against the piston rod (12) which in turn moves the piston (14), whereby to urge the fluid contained within the cylinder out of fluid outlet (18), whereby the same is caused to do work.

Figure 3:
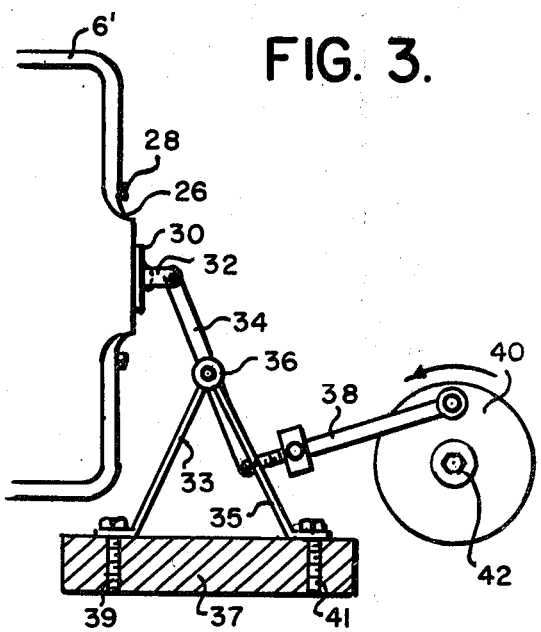
FIG. 3 is a partial view of an end portion of a deformable container of the type shown in FIG. 1 showing a different means for transmitting the motion of fluid within the deformable container to create work.

In FIG. 3 there is shown an end portion of a container (8) having an upper surface (6) which container in the embodiment of FIG. 3, has a neck portion (26) about which is disposed a mounting (28) whereby to confine a created bulge in the neck (26) by virtue of deformation of the container (8). The neck portion (26) in turn has a face member (29) in turn connected to a short arm (32) which in turn is linkagely connected to lever (34) which rotates about and is connected on the opposing side of fulcrum (36) to eccentric arm (38) and in turn connected to the eccentric (40) of a rotating wheel (42) which in turn can directly or indirectly be connected to an energy providing means such as the armature of an electrical generator. The fulcrum (36) can in turn be mounted upon a stand (37) by the use of supports (33 and 35) via bolts (39 and 41).

Figure 4:
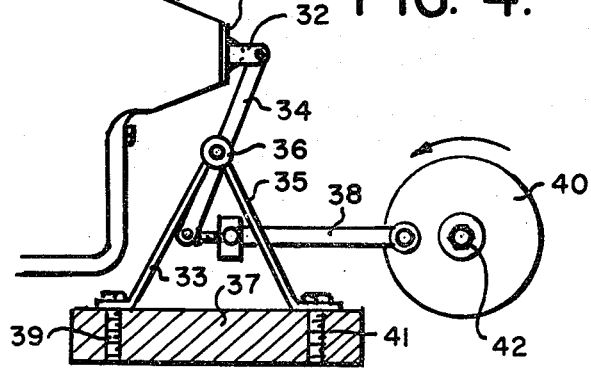
FIG. 4 is a view similar to FIG. 3, showing the extension of the neck portion of the deformable container when the same is subjected to the impact of a mass.

In FIG. 4, there is shown the disposition of the nose portion of the deformable container as it protrudes through the mounting (28) to dispose a diaphragm protion (44) therethrough.

FIG. 5, shows the disposition of containers (8a and 8b) accurately about a drum (50) disposed on a central shaft (52) and journaled for rotation via a rotating crank (54). The apparatus of FIG. 5 is disposable in the roadway to dispose at different times the respective plurality of deformable containers mounted on the drum. For instance, when deformable container (8a) is in need of repair, the drum can be rotated so as to dispose container (8b) in a position to be responsive to the weight of a vehicle passing thereover. In so rotating the drum container (8a) is removed from service and is positioned for repair. In FIG. 5 the means for transmitting the motion of the fluid to a transmission mechanism is not shown. The same can be provided with means of the type shown in FIGS. 3 and 4 discussed supra.

In FIG. 5, there are shown two defoamable containers (8a and 8b). Generally speaking, there will be additional defoamable containers on the opposed side of the revolvable drum.

FIG. 6 shows an end view of a revolvable drum equipped with separate compartments (60a, 60b, 60c and 60d) each of which contain a separate deformable container equipped with an end port and diaphragm as shown which engaged a suitable transmission mechanism. The rotatable drum of FIG. 6 has compartments (60a, 60b, 60c and 60d) in which there are disposed separate deformable containers. In the form shown in FIG. 6, each container has a cross-sectional shape of a quarter-circle. Each of the respective deformable containers has means for engaging the transmission mechanism. In FIG. 6 the means are the same. It will be realized that different means can be provided for engagement with the transmission mechanism. In FIG. 6 the engagement means is similar to that shown in FIGS. 3 and 4, wherein the container comprises a neck portion having an end face 29, disposed in a mounting (28) for engagement with the transmission mechanism. Partition members (61 and 62) divide the drum into the respective portions, these partitions interconnecting with the shaft (64). The mechanism is provided with means for rotating the same and for disposing the same in rotatable position, such means not being shown.

In FIG. 7 there is shown a particularly desirable embodiment of the invention in which there are plurality of tubes (66a, 66b, 66c, 66d, 66e, 66f, and 66g) disposed within the deformable container (8) which are interconnected at their respective ends with common manifolds (68 and 70) which in turn are interconnected to fluid surge lines (72 and 74) which transmit the fluid when moved by deformation of the container and the respective collapsible elastic and deformable tubes therein (66a–66g) so as to transmit a pulsating energy to a transmission mechanism. This apparatus is particularly useful for roadways in which slow moving traffic is expected. It can also be disposed beneath the rails or rail ties of a railroad. One means for disposing the same is shown in FIG. 8 wherein a vertically displaceable highway section (78) is disposed between sections of highway (79 and 81). The highway section (78) can be slightly depressed to affect a rapid surge of the fluid from the individual lines (66a–66g) to manifolds (68 and 70) and thus to surge lines (72 and 74). Alternatively instead of disposing the deformable container (8) beneath a section of highway (78) it can be disposed beneath rails or rail ties of a railroad. It can have such a dimension as to accommodate multiple vehicles as they pass thereover, the vehicles being disposed next to one another transversely or longitudinally along the roadbed.

Another embodiment of the invention is shown in FIGS. 9 and 10. In the device of FIG. 9, a generally planar member 102 of slight convex shape is disposed along a roadway and is provided with a transverse beam (104) thereon. The transverse beam is connected in turn to a piston rod (106) connected to a piston (108) disposed in a cylinder (110) equipped with a fluid outlet line (112). A fluid inlet line (not shown) is also provided.

The fluid outlet line (112) is in fluid communication with a transmission mechanism generally indicated by reference 114. The fluids surge through line (112) can strike fins on a central wheel whereby to cause rotation of central fins (not shown) on a shaft (116) in turn connected to a pulley (118) about which there is disposed a belt (120) in turn connected to a pulley (122) of an electrical generator (124) whereby to rotate the armature of the electrical generator and to generate electricity. The electrical energy can flow through the appropriate lines (not shown) to a storage battery whereby the pulsating electricity created by virtue of constant displacement of the fluid in the cylinder (110) stores electricity.

In the device of FIG. 9 there is a plurality of vertically disposed guides (130 and 132) which depend from the transverse beam (104) and at their terminal end are connected to bellows elements (134 and 136). These bellows elements serve to return the transverse beam following its depression by the weight of a vehicle so that it is in position for redisplacement by virtue of the weight of a motor vehicle passing thereover.

The embodiment of FIG. 10 is one in which there are plurality of cylinders, each of which contains a fluid, a piston rod connected to a portion of the generally planar member. In the device of FIG. 10, there are provided longitudinally running beams (140 and 142) which run in the direction of the roadway i.e. in the direction of traffic movement. These longitudinally running beams are each connected to piston rods (144 and 146) in turn connected to pistons (148 and 150) contained in cylinders (152 and 154). These cylinders in turn have fluid outlet lines (156 and 158) which are connected to a common fluid surge line (160) which in turn is connected to the power transmission mechanism. When a vehicle passes over the generally planar member (102) both of the piston are actuated to displace their fluid into the surge line (160) whereby the respective shafts and pulleys are caused to move to generate electricity which can be stored.

In the apparatus of FIG. 10 the generally planar member (102) is hinged at (180) at its upstream point. Downstream thereof it is raised at (182) so as to be vertically displaceable in response to vehicles movement. This vertical displacement in turn causes movement of the piston rods (144 and 146) and power generation in accordance with such movement.

The apparatus of FIGS. 9 and 10 preferably utilizes a transverse of parellelly positioned beam in contact with the piston rods. The beam itself may be in direct contact with the tires of a motor vehicle passing thereover or, alternatively, can be covered by a mat of proper composition to isolate the beam from direct contact with the vehicles and from the inadvertent pedestrian or motorist who alights from his car over this area. Other arrangements of the beam mechanisms can be provided for extracting large or minute pockets of energy from vehicular traffic, utilizing the velocity and mass of the vehicles passing over the traffic area selected. It can be accomplished by suspending a plate of suitable dimensions and rigidity between two beams which are positioned parallel to the roadway or traffic area. In this way the vehicles do not move in contact with an extraneous element of highway construction, but the vehicular lane itself moves up and down and provides the up and down motion upon the two beams. This derived energy is transmitted to connecting elements of a mechanical nature, a compressible element such as air or a relatively incompressible hydraulic fluid such as hydraulic oil. When this motion is conducted to a series of devices which are capable of utilizing the work or power produced.

The invention herein has been described with particular emphasis upon placing the power-generating mechanism in the form of a roadbed such as in a motor vehicle e.g., automobile roadbed. It is to be understood that this mechanism can be placed in a highway, beneath a railroad track, in a parking lot, weighting station, a drive-in area or any area or surface over which a vehicle normally passes. It particularly can be placed in those positions where it is desired to slow up traffic, such as on the down hill side of the road or at toll booths or areas preceding sharp curves in the road. The assembly can be utilized to generate the electricity required to light the street lamps and roadway signs employed, thus, utilizing inexpensive energy normally wasted. Alternatively, this energy can be used to produce heat to melt snow, to provide an operator of a battery powered automobile with an area off the highway to energize his battery, to provide special electrical equipment in lanes for new highways, thus making available an electrical system whereby the electric automobile can run directly from electricity from overhead wires or rails. Alternatively, the devices can comprise the roadbed or can be inserted in an existing roadway itself to provide contacts between the imbedded electrical system and the electric car. The roadway mechanism of this invention is capable of multiple uses and can be provided in urban, suburban and rural communities. It can be used as a valuable supplement during power failures or emergencies.

It will be recognized that the transmission mechanism by which the surge of fluid is converted into useful work, electric energy, heat or the like, is not critical and that numerous transmission mechanisms apart from those shown herein can be employed. The heart of the invention embodies the idea it is a road itself residing in the use of a fluid to create a pulse in turn to convert it into electricity.

It will be realized that in carrying out the invention, a bearing surface is employed which acts against fluid. That bearing surface in turn can be fluid itself as in the embodiment of the invention which uses a deformable container. In the operation of that embodiment, fluid acts upon fluid which in turn effects transmission of a pulse to create work. In the embodiment of the invention shown in FIGS. 9 and 10, a bearing surface in the nature of a piston is employed. Thus, it will be realized that in describing the invention by the use of a bearing surface, solid, liquid and gaseous bearing surfaces are contemplated.

The terms and expressions used herein have been used as terms of description and not of limitation as there is no intention, in the use of such terms and expressions, of excluding any equivalents or poritons thereof.

What is claimed is:

1. A roadway of the type over which moving vehicles pass, said roadway having positioned in the path of the movement of such vehicles a power generating means for generating power in response to movement of said vehicles over said roadway, said power generating means being in the form of an elastic compressible and deformable container which contains a fluid, said power generating means being responsive to and actuated by the weight of said vehicle as it passes thereover, said power generating means further comprising a vertically displaceable, generally planar member generally coplanar with the roadway, said power generating means comprising said fluid housed in a fluid housing, said fluid being in fluid communication with a generator via transmission means, said fluid while in said housing being in contact with a displaceable bearing surface which when displaced acts upon said fluid, said displaceable bearing surface in turn connected to said generally planar member, said container responsive to the weight of said moving vehicle, said container comprising a body portion disposed vertically beneath said generally planar member, said body portion connected to a neck member in fluid communication with the fluid in said container, said neck member containing a diaphragm portrudable from said body to engage said transmission means whereby when a motor vehicle passes over said generally planar surface, the same is vertically displaced whereby to displace said bearing surface against said fluid whereby said container is deformed and the fluid contained therein is displaced to engage said transmission.

2. A roadway according to claim 1, wherein said generally planar member is the upper surface of said elastic, compressible and deformable container.

3. A roadway according to claim 1, wherein said generally planar member bears against the upper surface of said elastic, compressible and deformable container.

4. A roadway according to claim 1, wherein said fluid is gas.

5. A roadway according to claim 4, wherein said fluid is air.

6. A roadway according to claim 1, wherein said fluid is a liquid.

7. A roadway according to claim 6, wherein said fluid is an oil.

8. A roadway according to claim 1, wherein said transmission means comprises a piston rod disposed in a transmission cylinder containing a transmission fluid disposed between the head of said piston and the cylinder, said piston rod is connected to said container whereby deformation of said container urges said piston rod into said transmission cylinder to displace said transmission fluid.

9. A roadway according to claim 1, wherein said container has disposed there against means to confine the same so that when said container is deformed, deformation is concentrated at one point proximate said or in engagement with said transmission means.

10. A roadway according to claim 1, wherein said container comprises an outwardly expandable diaphragm connected to a piston rod disposed in a transmission cylinder.

* * * * *